United States Patent [19]

Mühle

[11] 4,115,299

[45] Sep. 19, 1978

[54] FROTHING METHOD AND AN APPARATUS FOR CARRYING OUT THE METHOD

[75] Inventor: Dietrich Mühle, Kressbronn, Fed. Rep. of Germany

[73] Assignee: The Upjohn Company, Kalamazoo, Mich.

[21] Appl. No.: 663,865

[22] Filed: Mar. 4, 1976

[30] Foreign Application Priority Data

Mar. 26, 1975 [DE] Fed. Rep. of Germany ....... 2513492

[51] Int. Cl.² .............................................. C08J 9/06
[52] U.S. Cl. .................................... 521/170; 521/133; 521/917; 366/101; 422/128; 422/133
[58] Field of Search ............................. 23/252 R, 285; 260/2.5 BC, 2.5 AF; 259/151

[56] References Cited

U.S. PATENT DOCUMENTS

| | | | |
|---|---|---|---|
| 3,068,074 | 12/1962 | Boekemeier | 23/252 R |
| 3,102,004 | 8/1963 | Grintz | 23/252 R |
| 3,486,862 | 12/1969 | Unterstenhoefer | 23/285 |
| 3,771,963 | 11/1973 | Breer et al. | 23/252 R |
| 3,883,121 | 5/1975 | Guillaud | 23/252 R |
| 3,892,389 | 7/1975 | Contastin | 260/2.5 BC |
| 3,936,036 | 2/1976 | Fries | 23/252 R |

*Primary Examiner*—Eugene C. Rzucidlo
*Attorney, Agent, or Firm*—St. Onge, Mayers, Steward & Reens

[57] ABSTRACT

The invention relates to a frothing method for mixing a liquid propellant having a low boiling point with further components for the production of foamed material, more particularly polyurethane. The invention also relates to an apparatus for carrying out the method with a mixing head for high pressure mixing of the main components in a mixing chamber. The foam production is carried out in two stages involving a first chamber for receiving and premixing reactive polymeric components, and a second chamber intersected by the first into which the mix components are advanced while the frothing propellant is injected at the intersection. The frothed reactive polymeric mix is then discharged from the second chamber into a suitable mold for forming the finished polymerized product.

12 Claims, 1 Drawing Figure

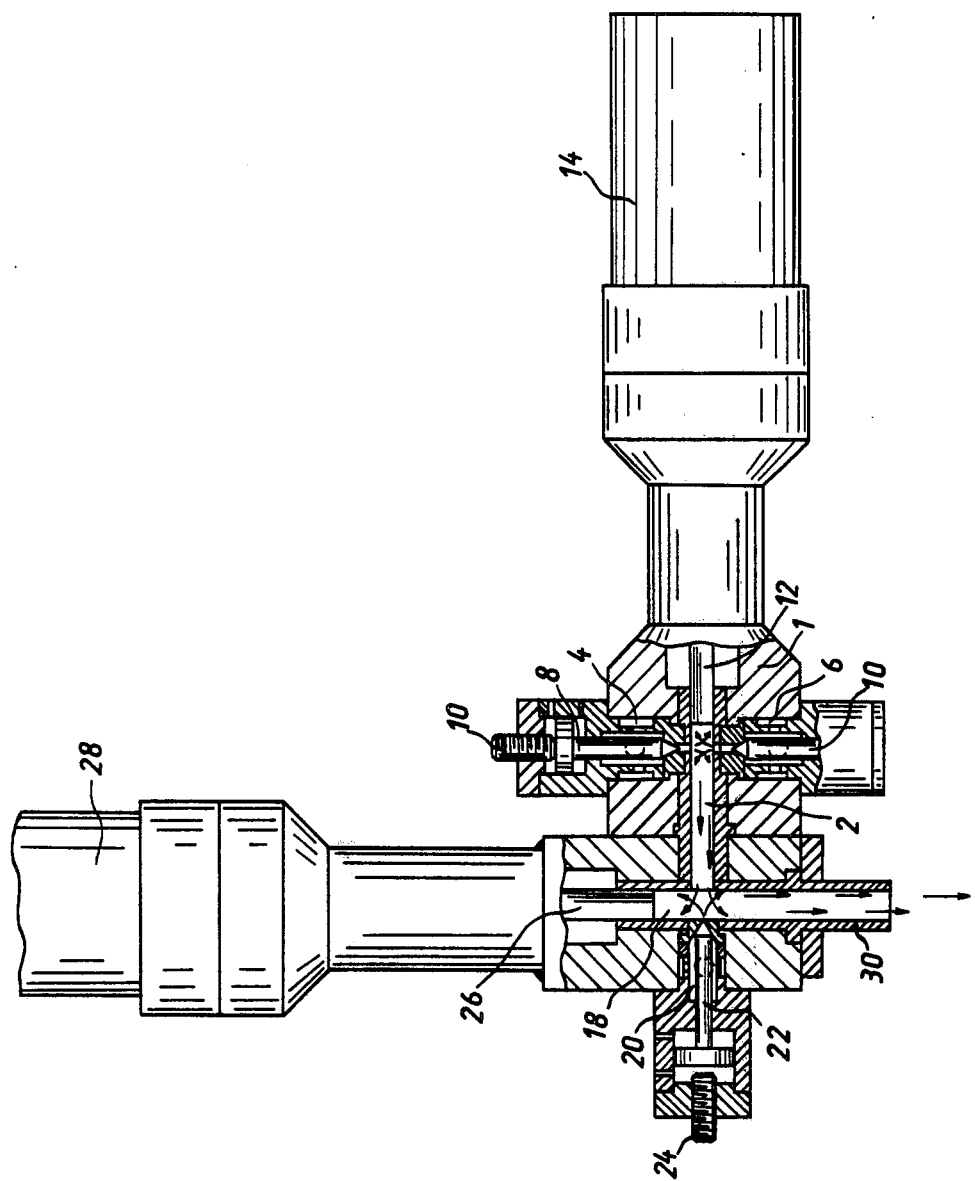

FROTHING METHOD AND AN APPARATUS FOR CARRYING OUT THE METHOD

BACKGROUND OF THE INVENTION

Field of the Invention

The frothing of a reactive component mix to produce a foamed product has been practiced heretofore by introducing a liquified, low-boiling propellant into reactive components which are injected under high pressure into a mixing chamber of a mixing head, causing them to impinge and thereby effect uniform mixing. Immediately upon emergence of the mix from the head, and even before any appreciable reaction between the components has occurred, there is an expansion due to partial vaporization of the liquified propellant with the reduction in pressure, producing a "pre-foamed" creamy product termed "froth".

The remainder of the propellant only evaporates at a high temperature, at which also the main components react. As a result there is a further expansion of the "pre-foamed" product to form a solid foamed material. The use of the "frothing" method accordingly divides up the foaming process into two stages.

The particular difficulty with this method is to be found in the mixing of the propellant with the remaining components which must be carried out at a sufficiently high pressure to effect adequate mixing. A method has already been proposed in the case of which the propellant is injected directly upstream from the mixing head into the supply line of one of the main components. A disadvantage in this respect is, however, the fact that recycling in periods between shots is impossible, since there is as a result an enrichment of propellant in the supply container for the respective main component, for example for the polyol.

A direct injection of the propellant into the mixing head is not possible either, since low pressure injection is impossible in view of the high pressure obtaining in the mixing chamber, and high pressure injection, owing to the low boiling point of the propellant, leads to an almost explosive expansion.

Injection of the propellant into the direct extension of the mixing chamber is not possible either, since this would lead to an excessively high acceleration of the component flow which is already mixed. The mixing in of the propellant would accordingly be made more difficult and the speed of emergence, limited in view of casting or injection considerations, would be exceded. It is not possible to make the mixing chamber as a whole larger for technical reasons concerned with the mixing operation.

SUMMARY OF THE INVENTION

Therefore the aim of the invention is that of affording a method of the initially mentioned type whereby the propellant can be mixed in with the main components without the above mentioned short-comings occurring. Furthermore an apparatus for carrying out this method is to be provided.

In accordance with the invention this is achieved in that the main components are injected under high pressure into a first mixing chamber and the reaction mixture is advanced into a second mixing chamber intersected at an angle by the first mixing chamber and having a larger cross-section, where the propellant adjacent to the opening of the first mixing chamber into the second is metered in with a lower pressure. The second mixing chamber, running at an angle to the first mixing chamber, can readily be designed with a large cross-section and owing to this arrangement the injection of the propellant at relatively low pressure becomes possible directly at the position at which the cross-section increases. Moreover, by suitable selection of the cross-sectional features between the first and second mixing chambers, the flow speed of the reactive mixture can be held constant even after the metering in of the propellant. The second mixing chamber serves simultaneously as a flow stabilizing part.

Preferably the second mixing chamber is arranged to intersect at an angle of 90° with respect to the first mixing chamber. Injection of the residual mixture from the first mixing chamber is facilitated by this.

The propellant is preferably added in countercurrent flow relation to the flow of the reaction mixture coming from the first mixing chamber.

In accordance with the further development of the invention, a piston is arranged in the first mixing chamber in a sealing manner which on moving back uncovers the inlet opening for the reactive components to allow their injection under high pressure. After the end of the shot the piston moves out to expel the mix from the whole length of the first mixing chamber. Liquified propellant is simultaneously introduced at the intersection of the chambers through a port located in the second chamber opposite the intersection, in order to produce a froth. Thereafter a second piston, arranged in sealing manner in the second mixing chamber, advances to close the inlet opening or port for the propellant, thereby expelling the frothed mix from the whole length of the second mixing chamber and injecting the reaction mixture into a suitable mold. The pistons therefore have two functions: that is to say, on the one hand they serve as a closing body for the inlet openings or ports of the components; and secondly as a plunger which, after the end of a shot, effect a complete and rapid cleaning of the mixing chamber. In the case of prior known methods this is carried out by the use of swilling or flushing air, with which it is not possible to ensure any thorough cleaning of the mixing chamber, something which leads to gradual clogging of the mixing chamber owing to cumulating deposits.

The method can be carried out in an apparatus with a mixing head for high pressure mixing of the main components in one mixing chamber, wherein this mixing chamber opens into a second chamber, arranged at a right angle to the first and having a larger cross-section, and the inlet port for the propellant is arranged adjacent to the opening.

The specific advantages of the system in accordance with the invention lie in the fact that during non-operational periods, recycling of the components is made possible without problems of propellant accumulation; that at the end of a shot, thorough elimination of residues from the reaction mixture is carried out; and that neither flushing air nor a separate flow stabilizing part is required. Since the second mixing unit can in principle be a duplicate of the first one, particularly economic production of the apparatus is possible.

The second mixing head can also be removed so that use of the first mixing head in accordance with conventional methods becomes possible.

BRIEF DESCRIPTION OF THE DRAWINGS

In what follows an embodiment of the invention will be described with reference to the enclosed drawing in which FIG. 1 shows a diagrammatic side-view of the apparatus, parts important for the invention being represented in cross-section.

DETAILED DESCRIPTION OF THE PREFERRED EMBODIMENT

As will be seen from the drawing, the apparatus comprises a first conventional mixing head 1 for high pressure mixing of two raw reactive materials, as for example polyol and isocyanate in the case of the production of polyurethane foam material. In the interior of the mixing head 1 there is a cylindrical mixing chamber 2, in whose wall mutually diametrically opposite inlet ports or jet ports are provided for the components. The latter circulate, coming from the usual high pressure pumps (not shown), through prepressure chambers 4, 6, having connection to conventional feed and return lines (also not shown). The outlet cross-section of the jet ports can be controlled or changed by means of valve cones 8 and 10. The valve cones are actuated by pistons acted upon by control pressure in conventional manner, and the limiting position of the pistons can be changed by means of a setting screw 11 so that the pressure of the emerging flow can be limited to a certain maximum value. In the mixing chamber 2 a piston or plunger 12 is arranged to make a piston fit therewith and to be reciprocable therein. The piston is actuated by a hydraulic cylinder 14. In its retracted position it uncovers the inlet ports or openings for the polymeric components, and forms the rear limitation of the mixing chamber. In its extended position it fills the whole length of the mixing chamber 2 and accordingly closes also the inlet ports.

Placed at a right angle to the first mixing head 1 there is a second mixing head 16. As regards its construction, it is in principle the same as the mixing head 1 and essentially a structural duplicate thereof. Its attachment to the mixing head 1 is not shown but it can, however, be by any suitable fastening means, such as bolts.

In the interior of the mixing head 16 there is, again, a second mixing chamber 18 constructed similar to the first mixing chamber 2 and into which the mixing chamber 2 opens at a right angle, that is to say radially. On the projected longitudinal axis of the mixing chamber 2, an inlet port for the propellant is arranged in the wall of the mixing chamber 18. The propellant circulates in a prepressure chamber 20, through conventional feed and return lines not shown. The propellant inlet port or opening into the mixing chamber 18 is controlled or monitored by a valve cone 22, which is actuated by a piston acted upon by a control pressure. The limit of displacement of the piston can be adjusted by means of a setting screw 24. The mixing chamber 18 is also constructed cylindrically but has a larger diameter than the mixing chamber 2. In the mixing chamber 18 there is also disposed a piston or plunger 26 which is arranged to be reciprocated therein with a piston fit. This piston 26 is actuated by a hydraulic cylinder 28. In its rear or retracted position, the piston 26 forms the rear limitation of the mixing chamber while in its advanced or extended position it fills up the whole mixing chamber 18 and closes the inlet port for the propellant. The mixing chamber 18 terminates at its open end in a pipe connector 30, extending from the mixing head 16 laterally, which can be constructed for receiving the inlet part of a mold.

The manner of operation of the apparatus is as follows. The component flows circulate coming from the high pressure pumps into the prepressure chambers 4 and 6. After the return ducts (not shown) have been closed by valves, the full pump pressure becomes established in the whole system. The valve cones 8 and 10 are now moved backwards to allow flow through the entry ports or openings. The piston 12 actuated by the hydraulic cylinder 14 moves back into its rear terminal position and uncovers the entry ports leading to the mixing chamber 2. The components are thus injected in opposing streams to form a first-stage homogenous mixture.

This first-stage reaction mixture flows into the second mixing chamber 18, and the propellant is introduced at this point to mix with the flow entering the chamber radially, the direction of the propellant being contercurrent to the direction of the entering flow. Owing to this type of introduction a satisfactory mixing operation is thus ensured.

Since the cross-section of the second mixing chamber is larger than that of the first mixing chamber 2, upon entry of the flow into the mixing chamber 18 a slowing down or stabilization and drop in pressure occurs. The propellant can therefore be added at a lower pressure at this point. The cross-sectional features can be so selected that the speed of the reaction mixture in the chamber 18 and the expanding propellant is not substantially greater than the speed obtaining in the mixing chamber 2. The "pre-foamed" second-stage reaction mixture or "froth" emerges and is charged into a mold via the pipe connector 30. The mixing chamber 18, due to its length, serves simultaneously for stabilization of flow conditions so that separate provision of a stabilization unit is not needed.

At the end of the shot, the piston 12 is advanced and closes the inlet ports or openings for the main components and pushes all residues of material located in the mixing chamber 2 into the mixing chamber 18. Following this the piston 26 also advances, closes the inlet port for the propellant and pushes all residues of material remaining in the mixing chamber 18 through the pipe connector 30. At this time the valve cone 22 closes the inlet opening or port for the propellant, so that the piston 26 may return into its upper resting position immediately after expulsion. The apparatus is therefore fully ready for the next working stroke.

It is possible, in the case of another embodiment of the apparatus, to have the angle between the two mixing chambers something other than precisely equal to 90°. Such an embodiment does not, however, provide for as satisfactory mixing of the reaction mixture with the propellant and is therefore regarded as being less desirable than the apparatus shown. The invention is however intended to comprise such an embodiment.

I claim:

1. In a frothing method for mixing a liquid propellant having a low boiling point with further components for production of foamed material, the steps which comprise separately injecting said further components under high pressure into a first cylindrical mixing chamber closed at one end and open at the other, to produce a first-stage, reactive mix in said first chamber;

advancing said first-stage mix through the open end of said first chamber to a second cylindrical mixing chamber, larger than the first and intersected by the first at the open end of the latter, said second chamber being closed at an axial end adjacent said intersection but open at its opposite axial end;

introducing said liquidified propellant into said first-stage mix through a port in said second chamber at said intersection of said chambers, whereby to provide a second-stage mix in said second chamber; and then discharging said second-stage mix from said open end of said second chamber to allow said mix to expand and form said foamed material.

2. A frothing method as defined in claim 1, wherein the angle of axial intersection between the first and second mixing chambers is substantially 90°.

3. The frothing method as defined in claim 1, wherein the propellant is introduced in countercurrent flow relation to the flow of the mixture coming from said first mixing chamber.

4. The frothing method as defined in claim 1, wherein each of said first and second chambers has a plunger making a piston fit therewith, and wherein said steps also include moving the piston in said first chamber from an extended position therein, wherein it blocks said ports admitting said further components to said first chamber, to a retracted position wherein said piston unblocks said ports to allow injection of said components into mixing relation in said first chamber; and after advancing said first piston to move said first-stage mix through said intersection into said second chamber, moving said other piston from retracted to extended position in its chamber to block the ports through which said liquified propellant is introduced and also to expel said second-stage mix at said open end of said second chamber.

5. In a high pressure mixing head for producing a foamed material by mixing a liquified propellant having a low boiling point with further components for the production of said foamed material, said mixing head comprising in combination a first cylindrical mixing chamber closed at one end and open at the other, and ports opening into said chamber intermediate its axial ends, said ports respectively allowing injection therethrough into said chamber of said further components to produce a first-stage mix;

piston means for controlling the injection of said further components through said ports and for advancing said first-stage mix out of said open end of said first chamber;

a second cylindrical mixing chamber, closed at one end and open at the other, said second chamber being larger than the first and disposed with its axis intersecting the axis of said first chamber intermediate the axial extent of said second chamber to receive said first-stage mix;

port means opening into said second chamber adjacent said intersection of said chambers, and means for introducing said liquified propellant through said port means in countercurrent flow relation to said first-stage mix to produce a second-stage mix;

piston means for advancing said second-stage mix through said second chamber and out the open end thereof, said means also acting to interrupt introduction of liquified propellant at said second chamber port means during discharge of said second-stage mix from said second chamber.

6. A mixing head as defined in claim 5, wherein both mixing chambers are circular cylinders and said respective means for advancing the mix therein include respectively separate pistons making sliding fits therein, each of said pistons being reciprocable from retracted position, adjacent the closed ends of their respective cylinders, to extended position adjacent the open ends thereof wherein said pistons completely fill their respective cylinders, and means for reciprocating said pistons.

7. A mixing head as defined in claim 6, wherein said pistons close the respective ports in their cylinders in their respective extended positions.

8. A mixing head as defined in claim 6, which further includes a pipe connector at the open end of said second cylindrical chamber for delivery of foam product therefrom.

9. A mixing head as defined in claim 6, wherein said propellant port in said second chamber is located on an axial projection of said first chamber.

10. A mixing head as defined in claim 6, wherein said second mixing chamber is of suitable axial length to serve as a flow stabilizing part for said second-stage polymerized mix.

11. A mixing head as defined in claim 6, wherein each of said first and second cylindrical mixing chambers, pistons and means for reciprocating the latter are respectively substantially identical in construction.

12. A frothing method as defined in claim 1, wherein said further components are a polyol and isocyanate so that said resulting foamed material is a polyurethane.

* * * * *

UNITED STATES PATENT AND TRADEMARK OFFICE
CERTIFICATE OF CORRECTION

PATENT NO. : 4,115,299
DATED : September 19, 1978
INVENTOR(S) : Dietrich Mühle

It is certified that error appears in the above—identified patent and that said Letters Patent are hereby corrected as shown below:

Column 2, line 51, the word "mixing" is omitted between "second" and "chamber".

Column 6, Claim 12, lines 49-51 should immediately follow claim 1 and the claims renumbered correspondingly.

In the drawing:
    Set screw 10 should be renumbered as 11.
    Reference number 16 should be added to identify the second (left hand) mixing head.

Signed and Sealed this

Twenty-fourth Day of April 1979

[SEAL]

Attest:

RUTH C. MASON
Attesting Officer

DONALD W. BANNER
Commissioner of Patents and Trademarks